UNITED STATES PATENT OFFICE.

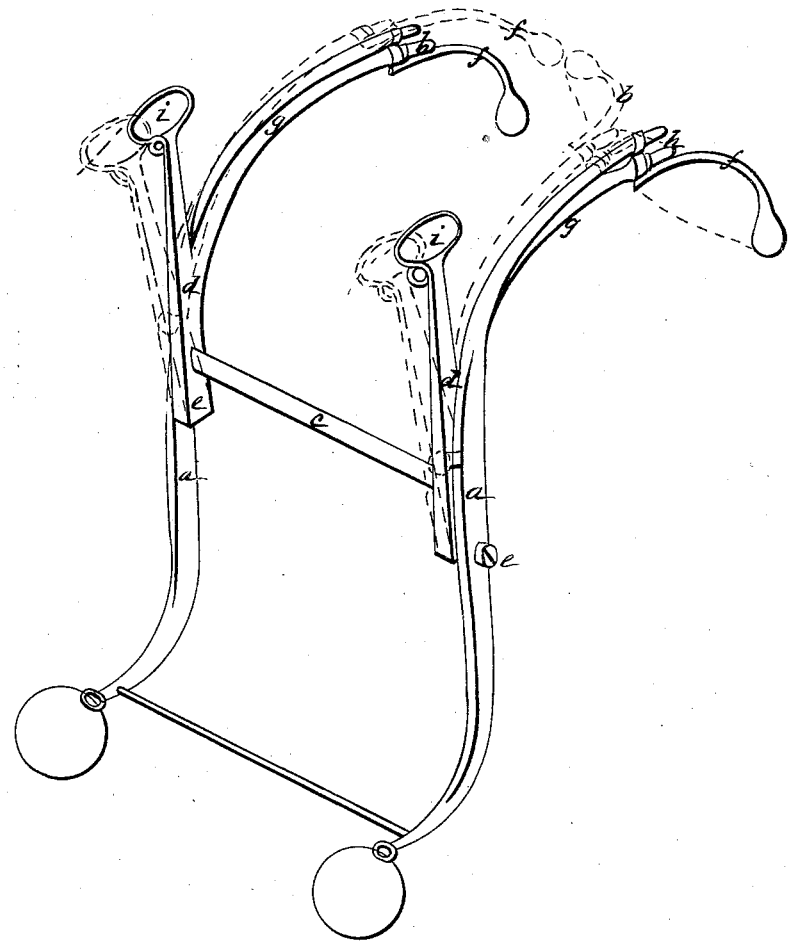

ANTOINE NIEL, OF BROOKLYN, NEW YORK.

BRIDLE-BIT.

Specification of Letters Patent No. 22,571, dated January 11, 1859.

*To all whom it may concern:*

Be it known that I, ANTOINE NIEL, of the city of Brooklyn, in the State of New York, have invented certain new and useful Improvements in Bits for Horses; and I do hereby declare the following to be a full and exact description thereof, reference being had to the accompanying drawings and to the letters and marks thereon.

By the drawing, forming part of this specification, is shown in perspective a bit for horses having my improvement attached to it.

The side or frame bars of the bit are marked ($a$), the bar uniting the frame-bars and which comes under the lower jaw of the horse ($b$), the mouth-bar or bit proper ($c$), the bar to which the mouth-bar is affixed ($d$).

The screw which affixes bar ($d$) to bar ($a$) is marked ($e$), the front end of bar ($d$), that to which is attached the gripper bar ($f$) is marked ($g$), and the nut which holds bar ($f$) to the bar ($g$) is marked ($h$).

The object of my invention is to control the horse when unruly or when under fear, and thus prevent injury to the rider or driver.

It will be seen that the means I employ consist of what I have named gripper-bars ($f$), which are so attached to the ordinary bit and so operated as to grip the nose of the horse whenever the rider or driver desires to check him. These gripper-bars ($f$) are fitted upon the end of the frame-bars of the bit and have a sliding motion upon them. They are also fitted upon the ends of the bars ($g$) and held upon them by nuts ($h$), which screw upon the ends of the bars ($g$). The double-eyed termination of the gripper-bars—bar ($a$) passing through one eye and bar ($g$) through the other eye—allows the gripper-bars a double motion, a sliding motion upon bar ($a$) and a half rotary motion upon that bar and also upon bar ($g$).

Now it will readily be perceived that if at any time the rider or driver wishes to check the horse he has only to pull the rein attached at ($i$) and the grippers are forced into the position shown on the drawing by red lines, when the nose of the horse will be pressed upon more or less effectively as the force may be exerted, and the horse thus be brought to a perfectly quiet and controllable condition.

Having thus fully set out my invention what I claim as new and desire to secure by Letters Patent is, 1. The combination of the gripper bars, constructed substantially as described, with the bars of the bit of the horse.

2. Attaching the gripper bars by their double-eyed ends and by the screw nuts to the bars ($g$) and ($a$) as here set forth.

This specification signed this 9th day of December, 1858.

ANTOINE NIEL.

Witnesses:
L. L. COUES,
T. T. EVERETT.